(12) United States Patent
Johnston et al.

(10) Patent No.: US 6,209,930 B1
(45) Date of Patent: Apr. 3, 2001

(54) ANGLING ACCESSORY DEVICE

(76) Inventors: Howard H. Johnston, 9626 E. Kalil Dr., Scottsdale, AZ (US) 85260; Ronald A. Yapp, 2401 E. Squaw Peak Dr., Phoenix, AZ (US) 85016

( * ) Notice: Subject to any disclaimer, the term of this patent is extended or adjusted under 35 U.S.C. 154(b) by 0 days.

(21) Appl. No.: 09/283,712

(22) Filed: Apr. 1, 1999

(51) Int. Cl.[7] ................ B65H 69/04; A01K 91/04; A01K 97/00
(52) U.S. Cl. ................................ 289/17; 43/4
(58) Field of Search .............. 289/17, 18.1; 43/4; 7/106; 140/93.6, 101, 124, 149; 242/472, 475.1, 916

(56) References Cited

U.S. PATENT DOCUMENTS

| 2,242,341 | 5/1941 | Brignall . |
| 2,394,807 | * 2/1946 | Robinson ................ 140/149 |
| 2,570,575 | 10/1951 | Lindbloom . |
| 2,648,364 | 8/1953 | Corella . |
| 2,683,306 | 7/1954 | Brignall . |
| 2,783,571 | * 3/1957 | Stilwell ........................... 43/1 |
| 2,926,036 | 2/1960 | Wimberley . |
| 2,943,650 | * 7/1960 | Rubin ........................... 140/119 |
| 2,964,069 | * 12/1960 | Chappel et al. ............. 140/119 |
| 3,131,732 | * 5/1964 | Thurston ...................... 140/119 |
| 3,494,385 | * 2/1970 | Hanigan ...................... 140/93.6 |
| 3,578,035 | 5/1971 | Parker . |
| 3,625,556 | * 12/1971 | Stromberg ..................... 289/17 |
| 3,695,311 | * 10/1972 | Hanigan ...................... 140/93.6 |
| 3,712,651 | * 1/1973 | Shockley ....................... 289/17 |
| 3,893,254 | * 7/1975 | Nack ............................... 43/1 |
| 4,064,610 | * 12/1977 | Murray ....................... 29/243.5 |
| 4,333,614 | * 6/1982 | Flax ............................... 289/17 |
| 4,714,281 | * 12/1987 | Peck ............................. 289/1.5 |
| 5,685,037 | 11/1997 | Fitzner et al. . |

* cited by examiner

Primary Examiner—Michael A. Neas
(74) Attorney, Agent, or Firm—Parsons & Goltry; Robert A. Parsons; Michael W. Goltry

(57) ABSTRACT

In an end of a line passing through a hook-eye of a fishing hook with the end held adjacent a standing part of the line, apparatus for wrapping the end of the line around the standing part comprising a drive element mounted to rotate in response to exertion of a force and a clamp carried by the drive element for holding the hook.

17 Claims, 6 Drawing Sheets

ANGLING ACCESSORY DEVICE

FIELD OF THE INVENTION

This invention concerns angling accessories and, more particularly, a tool for wrapping the end of line around a standing part of the line for forming an eye that is part of an attachment knot.

BACKGROUND OF THE INVENTION

A fisherman is no better than his knots. It is no good to own the best tackle and have an abundance of fishing knowledge and skill if, when fish are hooked, knots give way. The angler must therefore pay close attention to his knots. Under most conditions, an angler needs to know how to tie only a few knots, one being the clinch knot. The clinch knot is favored among fly fisherman for tying flies to leader tippets. To tie the clinch knot, the end of the leader is passed through the hook-eye of a fishing hook and the end brought back and wrapped, normally four to ten times, around the standing part of the leader to form an eye in the leader at the hook-eye. After passing the leader end through the eye, the standing part of the leader and the leader end are pulled to form a knot drawn tightly against the hook-eye.

On a brisk day when hands are cold and for the elder fisherman who has lost dexterity in his hands, tying a clinch knot can prove difficult and frustrating. Although the well-traveled angler normally employs a vast array of gadgets and accessories in practicing his art, needed is yet another to provide the angler with a means for easily and efficiently tying a clinch knot or any other knot that requires wrapping the leader end around the standing part of the leader.

Accordingly, in an end of a line passing through a hook-eye of a fishing hook with the end held adjacent a standing part of the line, it is a purpose of the invention to provide apparatus for wrapping the end of the line around the standing part for forming an eye in the line as part of an attachment knot.

It is another purpose of the invention to provide new and improved apparatus that are easy to use.

It is still another purpose of the invention to provide new and improved apparatus that are easy to construct.

It is a further provision of the invention to eliminate the difficulty of tying an attachment knot to a fishing hook.

It is still a further purpose of the invention to provide new and improved apparatus that are inexpensive.

SUMMARY OF THE INVENTION

In an end of a line passing through a hook-eye of a fishing hook with the end held adjacent a standing part of the line, the above problems and others are at least partially solved and the above purposes and others are realized in new and improved apparatus for wrapping the end of the line around the standing part of the line for forming an eye in the line as part of an attachment knot. The invention is generally comprised of a drive element mounted to rotate in response to exertion of a compressive or rotational force against the drive element and a clamp carried by the drive element for holding the hook. The drive element is mounted to a body or housing to rotate between a normal unwound condition or state and a wound condition or state.

BRIEF DESCRIPTION OF THE DRAWINGS

The foregoing and further and more specific objects and advantages of the invention will become readily apparent to those skilled in the art from the following detailed description taken in conjunction with the drawings in which.

DETAILED DESCRIPTION OF A PREFERRED EMBODIMENT

In an end of a line passing through a hook-eye of a fishing hook with the end held adjacent a standing part of the line, the present invention provides new and improved apparatus for wrapping the end of the line around the standing part of the line for forming an eye in the line as part of an attachment knot. Ensuing embodiments of the invention are easy to construct, easy to use and provide the angler with a means for easily and efficiently tying a clinch knot or any other attachment knot that requires wrapping the leader end around the standing part of the leader.

Figure 1:
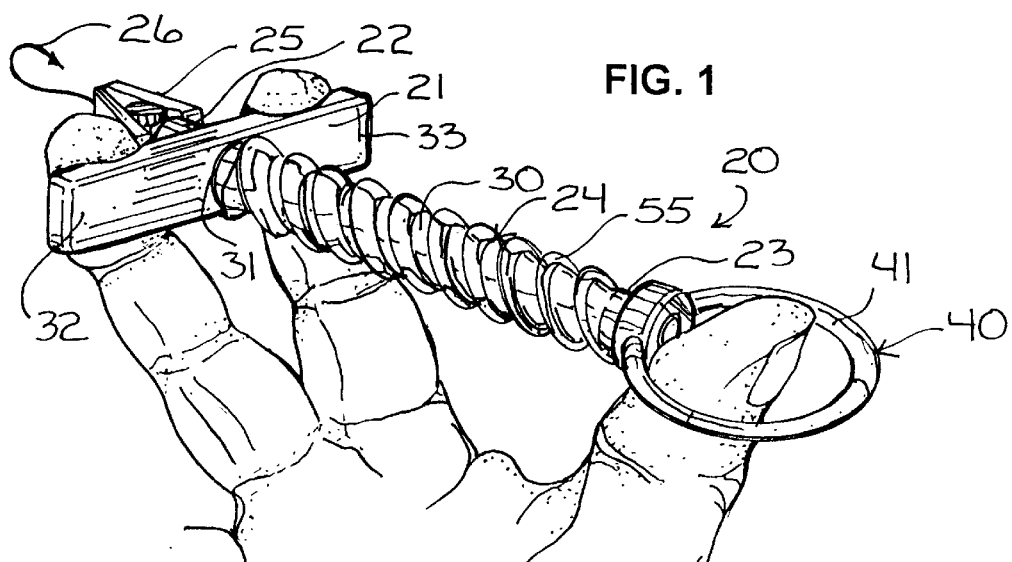
FIG. 1 is a perspective view of apparatus for wrapping an end of a line around a standing part of the line for forming an eye in the line as part of an attachment knot, the apparatus shown as it would appear held by a human hand.
Figure 2:
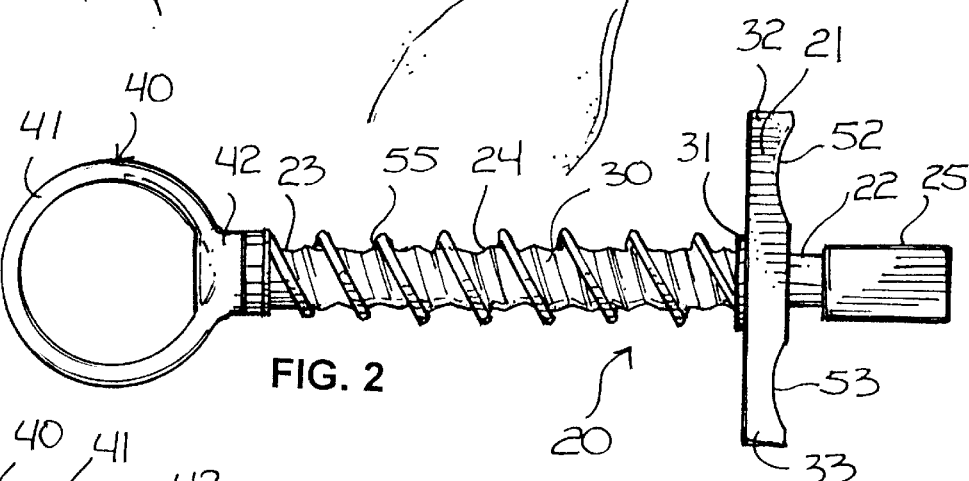
FIG. 2 is a top plan view of the apparatus of FIG. 1 comprising a grip carried between ends of a drive element and a clamp carried adjacent one of the ends of the drive element for holding a hook.
Figure 3:
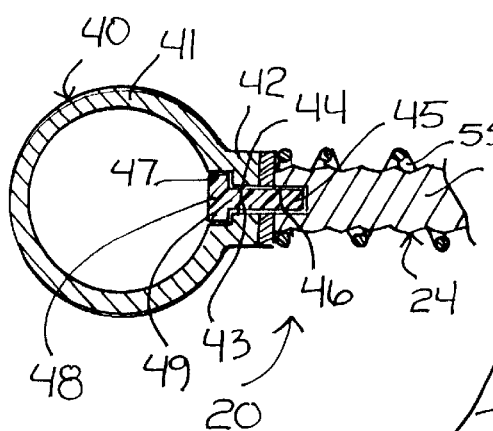
FIG. 3 is fragmented, partial cut-away view of the apparatus of FIG. 2 illustrating a finger ring attached to the threaded axle.

Turning now to the drawings, in which like reference characters indicate corresponding elements throughout the several views, attention is first directed to FIG. 1 which illustrates, in an end of a line passing through a hook-eye of a fishing hook with the end held adjacent a standing part of the line, apparatus 20 for wrapping the end of the line around the standing part of the line for forming an eye in the line as part of, for instance, a clinch knot or other form of attachment knot that requires wrapping the end of the line around its standing part, apparatus 20 shown as it would appear held by a human hand. With additional reference to FIG. 2, apparatus 20 comprises a body or grip 21 carried between ends 22 and 23 of a drive element 24 and a clamp 25 carried by end 22 for holding a hook 26. In this embodiment, drive element 24 comprises a threaded axle 30. Grip 21 is elongate and includes a threaded aperture 31 positioned intermediate its free ends 32 and 33 through which threaded axle 30 extends. End 23 supports a finger grip 40 for rotation. Finger grip 40 comprises a ring 41 having an enlargement 42 directed toward end 23. Looking to FIG. 3, a rivet or pin 43 extends through a bore 44 bound by enlargement 42 and terminates with an end 45 fixed in a recess 46 formed into end 23 of drive element 24. Finger grip 40 rotates about pin 43. Furthermore, bore 44 leads to a counterbore 47 that receives an enlarged head 48 carried by another end 49 of pin 43 capturing finger grip 40 with end 23 for rotation. Other means for mounting finger grip 40 with end 23 for rotation may be employed by the skilled artisan without departing from the invention.

Figure 4:
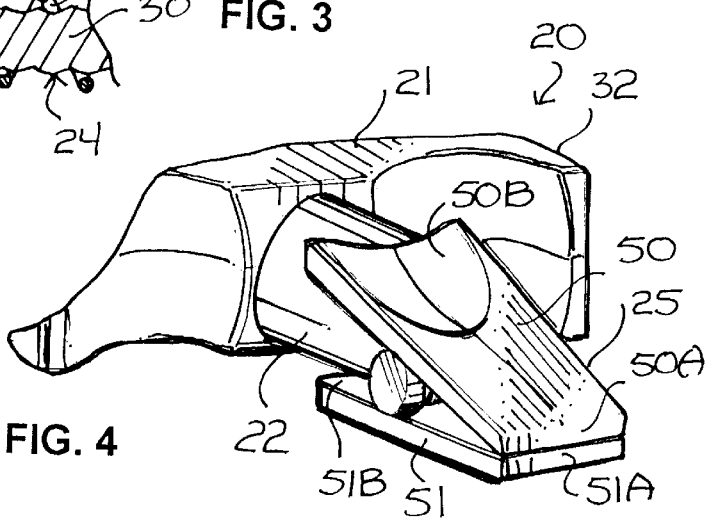
FIG. 4 is a fragmented view of the apparatus of FIG. 2 illustrating the clamp as it would appear in a closed condition.
Figure 5:
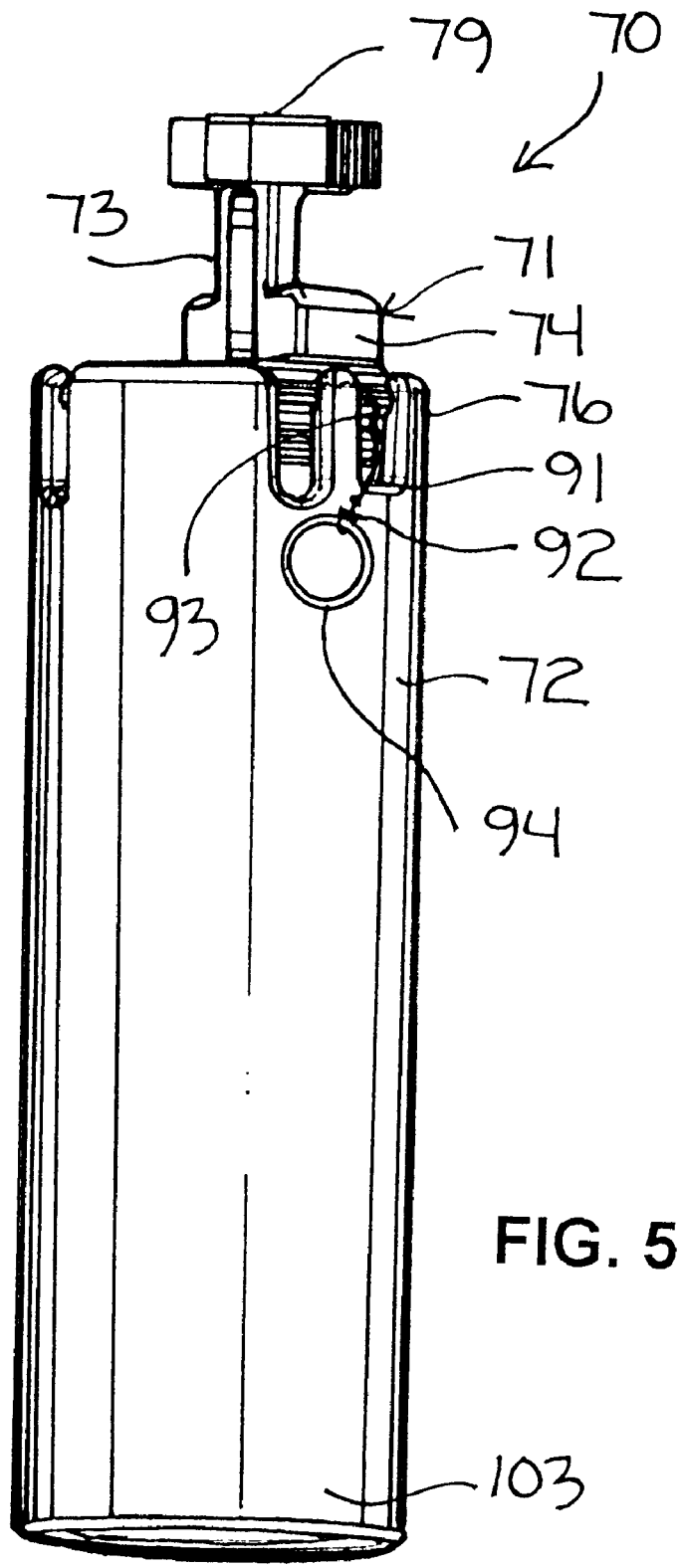
FIG. 5 is an isometric view of another embodiment of apparatus for wrapping an end of a line around a standing part of the line for forming an eye in the line as part of an attachment knot.
Figure 6:
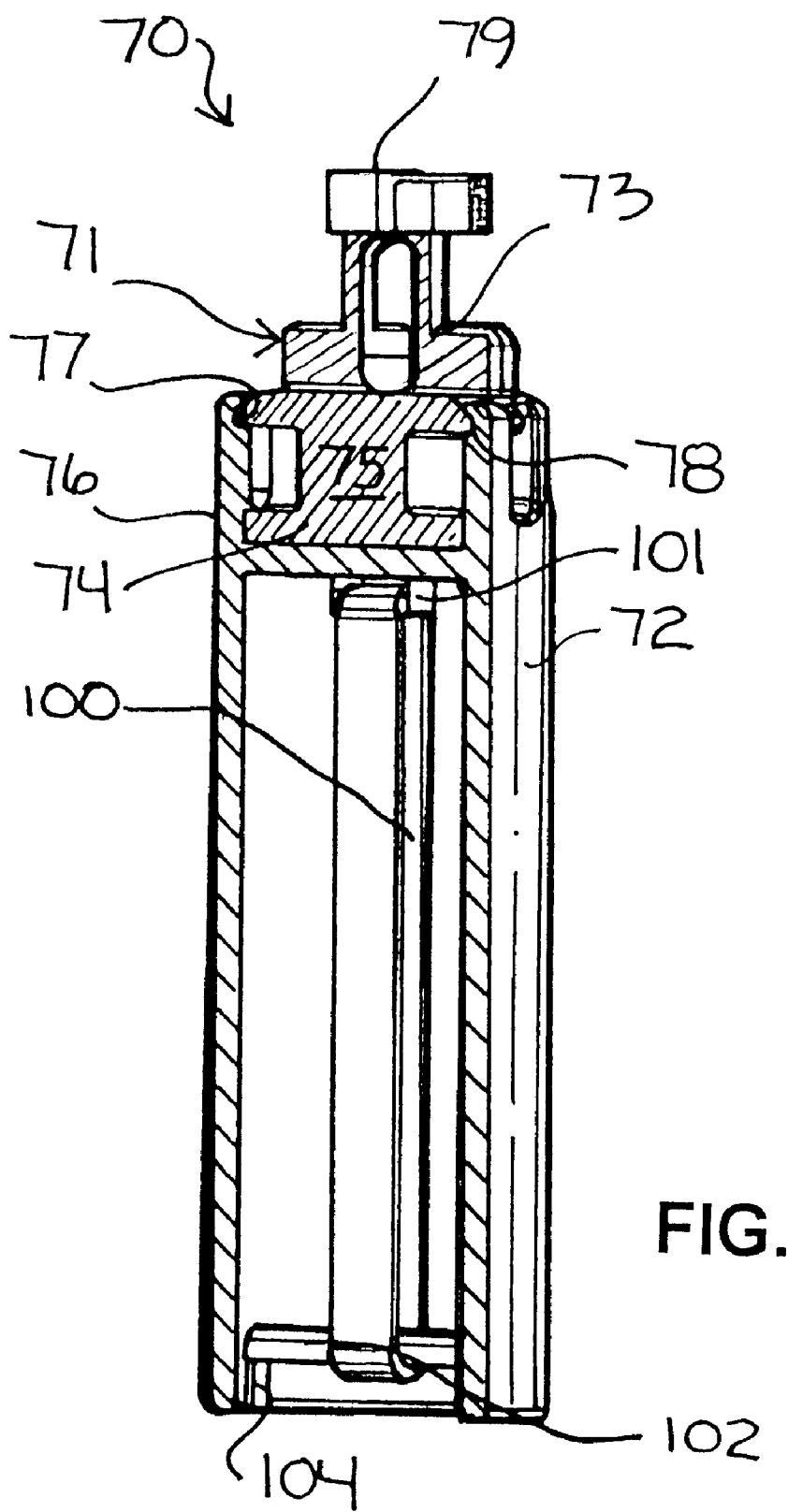
FIG. 6 is a vertical sectional view of the apparatus of FIG. 5.
Figure 7:
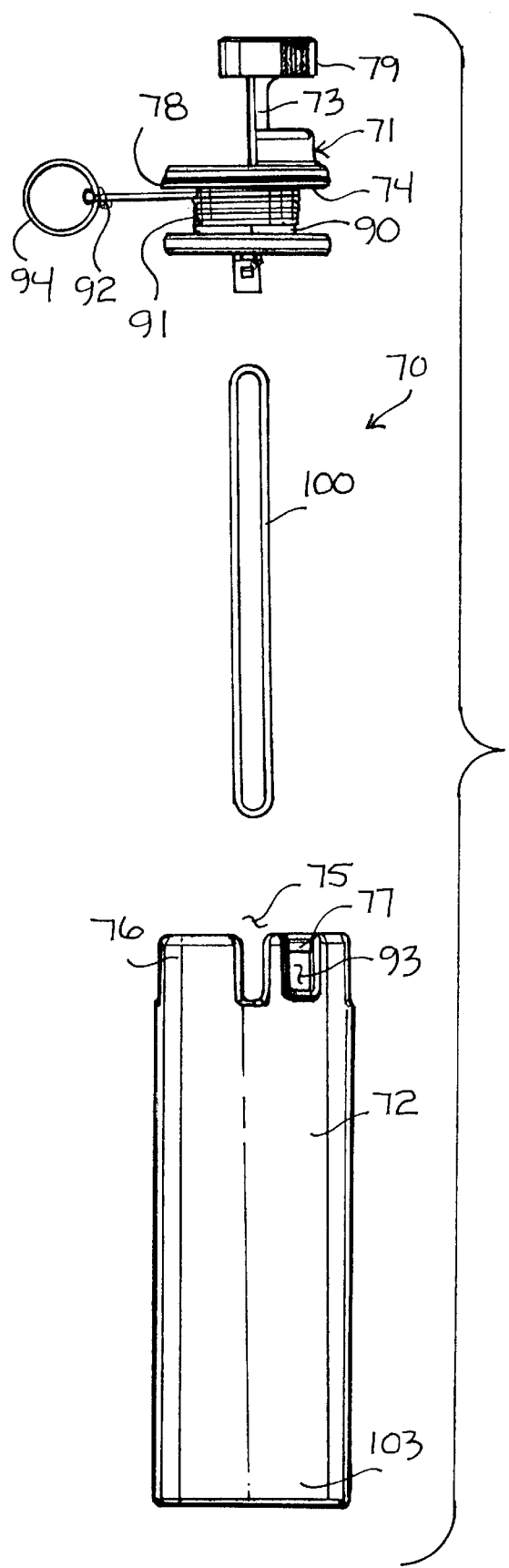
FIG. 7 is an exploded view of the apparatus of FIG. 5.

Regarding FIG. 4, clamp 25 is a conventional type commonly referred to by skilled artisans as an "alligator clamp." Clamp 25 includes jaws 50 and 51 mounted with end 23 for movement between a normal closed condition as shown or holding a hook between their distal or outer ends 50A and 51A, respectively, and an open condition. A biasing element (not shown), such as compression spring, captured between the jaws 50 and 51 normally hold them in the closed condition. To move them into the open condition, the first and second jaws 50 and 51 include proximal or inner ends 50B and 51B that may be grasped and pushed together. Other clamp devices, such as a screw clamp and the like, may be used with this embodiment of the invention if desired.

In operation, an angler may move the jaws 50 and 51 into the open condition, place the bend of a fishing hook between distal ends 50A and 51A and move jaws 50 and 51 into the closed condition to seize or capture the bend of the fishing hook between the distal ends 50A and 51A. So captured, the shank of the hook should extend outwardly from distal ends 50A and 51A and terminate with the hook-eye. The angler may then pass the end of a line, such as a leader or tippet, into and through the hook-eye and hold the end back adjacent a standing part of the line with one of his hands. To wrap the end of the line around its standing part, the angler, with his other hand, may rest his thumb against the finger grip 40 and two other fingers against grip 21 each adjacent one of its ends 32 and 33. For comfort, grip 21 includes grip recesses 52 and 53 (FIG. 2) facing clamp 25 each for comfortably accommodating a finger. With apparatus 20 so held, much like one would hold a conventional syringe, the angler may exert a compressive force against finger grip 40 in a direction toward grip 21. In so doing, a rotation is imparted to the threaded axle 30 as it passes through threaded aperture 31. This turns clamp 25 and the hook it holds, wrapping the end of the line successively around its standing part as the finger grip 40 is moved toward grip 21 forming an eye in the line adjacent the hook-eye comprising a part of an attachment knot, such as a clinch knot. To complete, for instance, the clinch knot, the angler may pass the end of the line through the eye and, by pulling the standing part and the end of the line, tightly draw the clinch knot against the hook-eye. After trimming excess line from the base of the knot, the angler may release the hook from the clamp 25 and assume his craft of fishing.

Threaded axle 30 carries a compression spring 55 that, in this specific example, engulfs threaded axle 30. Compression spring 55 extends from grip 21 to finger grip 40 and normally biases grip 21 away from finger grip 40 in what is considered an unwound or starting condition of threaded axle 30 shown in FIGS. 1 and 2. From this unwound or starting condition, movement of finger grip 40 toward grip into what is considered a wound or ending condition of threaded axle 30 completes the winding of the end of the line around its standing part. Although compression spring 55 is preferred for normally biasing threaded axle 30 in its unwound or starting condition, a rubber band or other similar biasing element may be used without departing from the invention. Furthermore, from its unwound to wound condition, threaded axle 30 and threaded aperture may be constructed to offer four, five or other selected number of turns of the end of the line around its standing part as desired by the angler.

Looking to FIGS. 5 through 9, shown is an alternate embodiment of apparatus 70 for wrapping the end of the line around its standing part for forming an eye in the line as part of an attachment knot. Apparatus 70 comprises a drive element 71 carried by a body, grip or housing 72 for rotation. Looking to FIGS. 6–8, in this embodiment drive element 71 comprises an extension 73 that extends outwardly from a base 74 and terminates with, and carries, a clamp 79 for holding a hook. Base 74 rests in a pocket 75 of housing 72 located adjacent an end 76 thereof. An annular groove 77 formed into housing adjacent end 76 matingly receives an annular tongue 78 of base 74 that holds base 74 to housing 72 for rotation.

Figure 8:
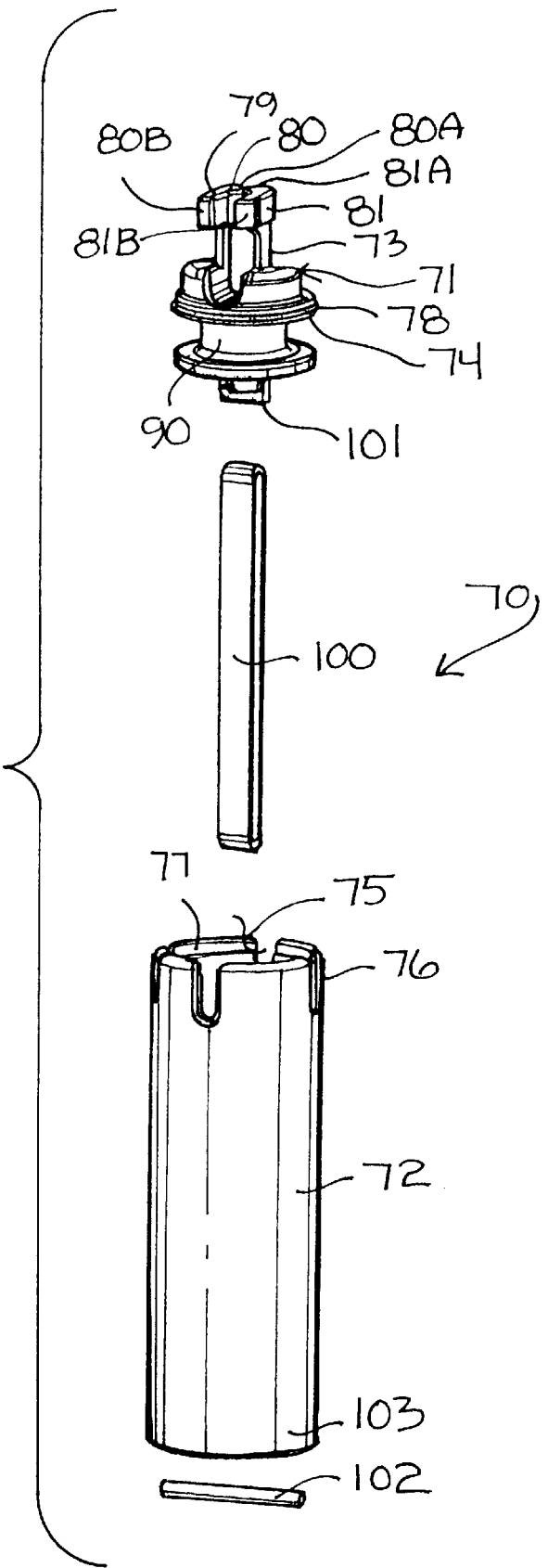
FIG. 8 is another exploded view of the apparatus of FIG. 5.

Regarding FIG. 8, clamp 79 includes jaws 80 and 81 mounted with extension 73 for movement between a normal closed condition as shown for holding a hook between their distal or outer ends 80A and 81A, respectively, and an open condition. A biasing element (not shown), such as compression spring, captured between the jaws 80 and 81 normally hold them in the closed condition. To move them into the open condition, the first and second jaws 80 and 81 include proximal or inner ends 80B and 81B that may be grasped and pushed together. Other clamp devices, such as a screw clamp and the like, may be used with this embodiment of the invention if desired.

Turning back to FIG. 7, base 74 defines an annular recess 90 located adjacent annular tongue 78. A flexible lanyard 91 is carried or supported by this annular recess 90 in a normally wound condition as shown and terminates with a free end 92 movable away from the drive element 71 for imparting a rotation to drive element 71. As shown in FIG. 4, housing 72 defines a window 93 that free end 92 extends through. A stop 94 carried by free end 92 prevents free end 92 from inadvertently receding into pocket 75 through window 93.

In operation, an angler may move the jaws 80 and 81 into the open condition, place the bend of a fishing hook between distal ends 80A and 81A and move jaws 80 and 81 into the closed condition to seize or capture the bend of the fishing hook between the distal ends 80A and 81A. So captured, the shank of the hook should extend outwardly from distal ends 80A and 81A and terminate with the hook-eye. The angler may then pass the end of a line, such as a leader or tippet, into and through the hook-eye and hold the end adjacent a standing part of the line with one of his hands. To wrap the end of the line around its standing part, the angler, with his other hand, may grasp housing 72 and, with free end 92 of lanyard 91 held between his teeth or fastened to his fishing jacket or shirt, move housing 72 away from free end 92. In so doing, flexible lanyard 91 unwinds from drive element 71 which imparts a rotation to carrier 71. This turns clamp 79 and the hook it holds, wrapping the end of the line successively around its standing part as the angler imparts this rotational force to the drive element 71 forming an eye in the line adjacent the hook-eye comprising a part of an attachment knot, such as a clinch knot. To complete, for instance, the clinch knot, the angler may pass the end of the line through the eye and, by pulling the standing part and the end of the line, tightly draw the clinch knot against the hook-eye. After trimming excess line from the base of the knot, the angler may release the hook from the clamp 79 and assume his craft of fishing.

Figure 9:
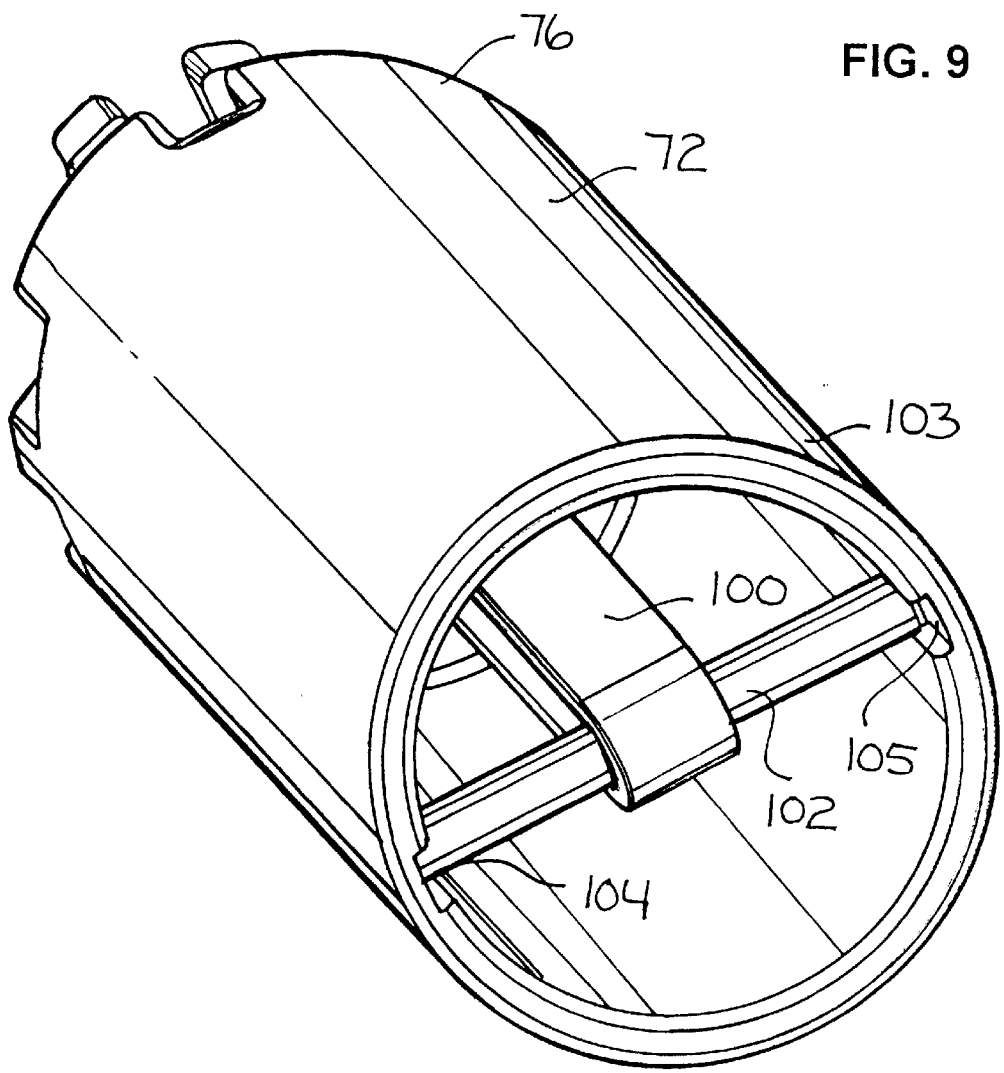
FIG. 9 is a bottom isometric view of the apparatus of FIG. 5.

Drive element 71 and housing 72 cooperate to support an elastic band 100 that, in this specific example, is supported in a stretch condition. Elastic band 100 is supported by and between a hook 101 carried by base 74 extending into housing 72 away from clamp 79 and a retaining post or bar 102 supported at its ends in slots 104 and 105 formed into housing 72 adjacent an end 103 thereof that opposes end 76 as shown in FIG. 9. Because elastic band 100 is normally supported by hook 101 and post 102 in a stretched condition, post 102 is securely held in slots 104 and 105. However, should elastic band 100 require replacement, the ends of post 102 may be easily removed from slots 104 and 105 for replacing the old elastic band with a new one.

Elastic band 100 normally biases drive element 71 in what is considered an unwound or starting condition characterized by flexible lanyard 91 oriented in its wound condition about annular recess 90. From this unwound or starting condition, movement of housing 72 away from free end 92 of flexible lanyard 91 into what is considered a wound or ending condition of drive element 71 completes the winding of the end of the line around its standing part. Although elastic band 100 is preferred for normally biasing drive element 71 in its unwound or starting condition, a compression spring or other similar biasing element may be used without departing from the invention. Furthermore, from its unwound to wound condition, drive element 71 and the length of flexible lanyard 91 may be constructed to offer four, five or other selected number of turns of the end of the line around its standing part as desired by the angler.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In an end of a line passing through a hook-eye of a fishing hook with the end held adjacent a standing part of the line, apparatus for wrapping the end of the line around the standing part comprising:

a clamp carried adjacent one of first and second ends of a threaded axle for holding the hook; and a threaded grip carried between the first and second ends of the threaded axle, wherein the threaded axle and the clamp rotate in response to exertion of a compressive force against the other of the first and second ends in a direction toward the threaded grip.

2. Apparatus of claim 1, wherein the threaded axle is mounted to rotate between unwound and wound conditions.

3. Apparatus of claim 2, further including means for normally biasing the threaded axle in the unwound condition.

4. Apparatus of claim 3, wherein the means comprises a compression spring carried by the threaded axle between the first and second ends.

5. Apparatus of claim 4, wherein the compression spring substantially engulfs the threaded axle between the first and second ends.

6. In an end of a line passing through a hook-eye of a fishing hook with the end held adjacent a standing part of the line, apparatus for wrapping the end of the line around the standing part comprising:

a drive element mounted to a housing for rotation;

a clamp carried by the drive element for holding a hook; and a lanyard carried by the drive element in a wound condition and having a free end, wherein movement of the free end away from the drive element rotates the drive element and the clamp.

7. Apparatus of claim 6, wherein the drive element is mounted to rotate between unwound and wound conditions.

8. Apparatus of claim 7, further including means for normally biasing the drive element in the unwound condition.

9. Apparatus of claim 8, wherein the means comprises an elastic band supported by the drive element and the housing in a stretched condition.

10. Apparatus of claim 6, wherein the free end of the lanyard extends through a window of the housing.

11. Apparatus of claim 10, wherein the free end of the lanyard supports a stop that prevents the free end from receding into the housing through the window.

12. Apparatus of claim 6, wherein the drive element rests in a pocket of the housing.

13. Apparatus of claim 12, wherein the drive element supports an annular tongue that mates with an annular groove carried by the housing adjacent the pocket.

14. In an end of a line passing through a hook-eye of a fishing hook with the end held adjacent a standing part of the line, apparatus for wrapping the end of the line around the standing part comprising:

a housing;

a drive element mounted to the housing at a fixed point for rotation between unwound and wound conditions in response to exertion of a force against the drive element;

a biasing element for biasing the drive element in the unwound condition; and a clamp carried by the drive element for holding the hook.

15. In an end of a line passing through a hook-eye of a fishing hook with the end held adjacent a standing part of the line, apparatus for wrapping the end of the line around the standing part comprising:

a housing;

a drive element mounted to the housing at a fixed point for rotation in response to exertion of a force against the drive element; and a clamp carried by the drive element for holding the hook;

wherein the drive element supports a lanyard in a wound condition and having a free end, wherein movement of the free end away from the drive element provides the force which rotates the drive element and the clamp.

16. Apparatus of claim 15, wherein the free end of the lanyard extends through a window of the housing.

17. Apparatus of claim 16, wherein the free end of the lanyard supports a stop that prevents the free end from receding into the housing through the window.

* * * * *